(12) United States Patent
Kahlert

(10) Patent No.: US 9,205,378 B2
(45) Date of Patent: Dec. 8, 2015

(54) $NO_2$ SLIP CATALYST

(76) Inventor: Bernhard Kahlert, Rietheim (CH)

( * ) Notice: Subject to any disclaimer, the term of this patent is extended or adjusted under 35 U.S.C. 154(b) by 402 days.

(21) Appl. No.: 13/518,121

(22) PCT Filed: Dec. 21, 2010

(86) PCT No.: PCT/EP2010/070365
§ 371 (c)(1),
(2), (4) Date: Sep. 4, 2012

(87) PCT Pub. No.: WO2011/085923
PCT Pub. Date: Jul. 21, 2011

(65) Prior Publication Data
US 2012/0321524 A1 Dec. 20, 2012

(30) Foreign Application Priority Data
Dec. 21, 2009 (EP) .................................... 09180263

(51) Int. Cl.
*B01D 50/00* (2006.01)
*B01D 53/94* (2006.01)
(Continued)

(52) U.S. Cl.
CPC ........... *B01D 53/9413* (2013.01); *B01J 23/002* (2013.01); *B01J 23/10* (2013.01); *B01J 23/22* (2013.01); *B01J 23/34* (2013.01); *B01J 23/63* (2013.01); *B01J 23/6562* (2013.01); *B01J 23/8986* (2013.01); *B01J 35/0006* (2013.01); *B01J 37/0244* (2013.01); *F01N 3/0231* (2013.01); *F01N 13/0097* (2014.06); *B01D 2255/1023* (2013.01); *B01D 2255/1025* (2013.01); *B01D 2255/206* (2013.01); *B01D 2255/2092* (2013.01); *B01D 2255/20723* (2013.01); *B01D 2255/30* (2013.01); *B01D 2258/012* (2013.01); *B01J 35/04* (2013.01);
(Continued)

(58) Field of Classification Search
CPC ............ B01J 23/46; B01J 21/02; B01J 35/02; B01J 23/63; B01J 35/04; B01J 23/22
USPC ........... 422/177, 180; 502/300, 303, 304, 355
See application file for complete search history.

(56) References Cited

U.S. PATENT DOCUMENTS

| | | |
|---|---|---|
| 4,591,580 A | 5/1986 | Kim et al. |
| 5,000,929 A | 3/1991 | Horiuchi et al. |
| 6,251,820 B1 * | 6/2001 | Tsuji .............................. 502/242 |
| 7,771,669 B2 | 8/2010 | Chigapov et al. |

(Continued)

FOREIGN PATENT DOCUMENTS

| | | |
|---|---|---|
| DE | 33 47 919 | 12/1986 |
| EP | 315 896 | 5/1989 |

(Continued)

*Primary Examiner* — Tom P Duong
(74) *Attorney, Agent, or Firm* — Greenblum & Bernstein, P.L.C.

(57) ABSTRACT

Disclosure relates to a slip catalyst for reducing $NO_2$ content in an exhaust train of an internal combustion engine flowed through by an exhaust gas flow, which has an oxidizing catalyst for the formation of $NO_2$ and a particulate filter arranged downstream for binding carbon black particles and simultaneous and/or subsequent reaction of the same with $NO_2$ formed on the oxidizing catalyst, having a substrate that is provided with a coating, which coating reduces a proportion of $NO_2$ in the exhaust gas flow flowing through. The coating has at least two elements from the group of rare-earth metals, which are present in the coating in the form of a salt or an oxide or in an elementary form and in a concentration of more than 300.0 $g/m^3$.

13 Claims, 2 Drawing Sheets

(51) Int. Cl.
*B01J 23/10* (2006.01)
*B01J 23/22* (2006.01)
*B01J 23/63* (2006.01)
*F01N 3/023* (2006.01)
*F01N 13/00* (2010.01)
*B01J 37/02* (2006.01)
*B01J 23/00* (2006.01)
*B01J 23/34* (2006.01)
*B01J 23/656* (2006.01)
*B01J 35/00* (2006.01)
*B01J 23/89* (2006.01)
*B01J 35/04* (2006.01)

(52) U.S. Cl.
CPC .......... *B01J2523/00* (2013.01); *F01N 2510/06* (2013.01); *F01N 2570/14* (2013.01)

(56) References Cited

U.S. PATENT DOCUMENTS

| | | | |
|---|---|---|---|
| 8,052,937 | B2 | 11/2011 | Chigapov et al. |
| 8,137,636 | B2 | 3/2012 | Chigapov et al. |
| 8,241,579 | B2 | 8/2012 | Chigapov et al. |
| 2007/0137187 | A1 | 6/2007 | Kumar |
| 2007/0219088 | A1 | 9/2007 | Chigapov et al. |
| 2009/0255236 | A1* | 10/2009 | Collier et al. .................. 60/297 |
| 2010/0223918 | A1 | 9/2010 | Chigapov et al. |
| 2010/0233046 | A1 | 9/2010 | Chigapov et al. |
| 2012/0011832 | A1 | 1/2012 | Chigapov et al. |

FOREIGN PATENT DOCUMENTS

| | | |
|---|---|---|
| EP | 1 837 076 | 9/2007 |
| EP | 2 153 896 | 2/2010 |
| WO | WO2009/118188 | 10/2009 |

* cited by examiner

$NO_2$ SLIP CATALYST

CROSS-REFERENCE TO RELATED APPLICATIONS

The present application is a U.S. National Stage of International Application No. PCT/EP2010/070365 filed Dec. 21, 2010, which published as WO 2011/085923A1 on Jul. 21, 2011, the disclosure of which is expressly incorporated by reference herein in its entirety. Further, this application claims priority under 35 U.S.C. §119 and §365 of European Application No. 09180263.7 filed Dec. 21, 2009.

BACKGROUND OF THE DISCLOSURE

1. Field of the Disclosure

The invention relates to a slip catalyst for reducing a $NO_2$ content in an exhaust train of an internal combustion engine flowed through by an exhaust gas flow, in particular an exhaust train of a diesel engine, which has an oxidizing catalyst for the formation of $NO_2$ and a particulate filter arranged downstream for binding carbon black particles and simultaneous and/or subsequent reaction of the same with $NO_2$ formed on the oxidizing catalyst, comprising a substrate that is provided with a coating, which coating reduces a proportion of $NO_2$ in the exhaust gas flow flowing through.

Furthermore, the invention relates to an exhaust train of an internal combustion engine, comprising an exhaust gas purification device flowed through by an exhaust gas flow, which has an oxidizing catalyst and optionally a particulate filter, wherein a slip catalyst for the reduction of a $NO_2$ content in the exhaust train flowed through by the exhaust gas flow is arranged downstream.

2. Background Description

According to the prior art, particulate filters are provided in exhaust trains of diesel engines, which particulate filters filter out the carbon black particles contained in the diesel exhaust gas. However, with increasing load by carbon black particles, the particulate filters lead to a higher exhaust backpressure. In order to avoid this, it is necessary to incinerate continuously or intermittently at certain time intervals the carbon black particles located on a particulate filter or filtered out thereby. An increased exhaust backpressure and/or a drop in the engine power can thereby be avoided.

A corresponding concept lies in connecting an oxidizing catalyst upstream of a particulate filter, which oxidizing catalyst oxidizes the nitric oxide (NO) contained in the exhaust gas to nitrogen dioxide ($NO_2$). The oxidizing catalyst is generally coated with a precious metal such as platinum or palladium for this purpose. In the particulate filter connected downstream, however, the carbon black particles are filtered out of the exhaust gas. The $NO_2$ present in the exhaust gas and the $NO_2$ (secondary $NO_2$) formed on the oxidizing catalyst reacts on the particulate filter with the carbon black particles held there with incineration of the same. Systems of this type operate automatically from temperatures of 250° C., i.e. the particulate filter is constantly regenerated without additional measures being necessary. In this context it is called passive regeneration. A corresponding device is referred to as a Continuous Regenerating Trap (CRT). It is also possible in this connection to provide only one component, which acts as an oxidizing catalyst, but at the same time also filters carbon black particles out of the exhaust gas flow, which are immediately reacted with $NO_2$ on the oxidizing catalyst.

The problem occurs in CRT systems that in all operating states, i.e., even at low operating temperatures in the exhaust train, an $NO_2$ excess is desired on or in the particulate filter so that a passive regeneration of the particulate filter can take place or the carbon black particles are 100% converted. This can mean that a $NO_2$ content at the end of the CRT system is increased compared to the exhaust gas directly exiting from the engine. An increased $NO_2$ content in the discharged exhaust gas is not desired, however. In fact, legislation currently stipulates that an increase in the $NO_2$ concentration in the exhaust train is no longer permissible or is permissible only within certain limits.

According to the prior art, it is possible with CRT systems to reduce a $NO_2$ content in the exhaust gas flow by providing so-called Selective Catalytic Reduction (SCR). A solution containing urea is thereby injected into the exhaust train after the particulate filter. The solution containing urea releases ammonia and reacts at a downstream catalyst with $NO_2$ with the formation of non-toxic gases. However, an SCR system requires a high operating expenditure. Thus, among other things, a tank must be provided for urea solution, which requires an additional expenditure in the production and operation.

SUMMARY OF THE DISCLOSURE

The aim of the invention is to disclose a slip catalyst of the type mentioned at the outset with which a reduction of a $NO_2$ content in an exhaust gas flow can be easily achieved.

It is a further aim of the invention to disclose an exhaust train of the type mentioned at the outset in which a $NO_2$ content in an exhaust gas flow can be easily reduced.

The aim of the invention is attained according to the invention in that with a slip catalyst of the type mentioned at the outset, the coating has at least two elements from the group of rare-earth metals, which are present in the coating in the form of a salt or an oxide or in an elementary form and in a concentration of more than 300.0 g/m³. The concentration data refer here and below to the elements per se regardless of whether the rare-earth metals are present in the form of a salt, an oxide or in an elementary form. The further object of the invention is achieved by an exhaust train of the type mentioned at the outset with a corresponding slip catalyst.

One advantage achieved with the invention is to be seen in particular in that the coating with at least two elements from the group of rare-earth metals leads to a significant reduction in the $NO_2$ content in an exhaust gas flow of a diesel engine. Furthermore, portions of hydrocarbons and carbon monoxide (CO) are effectively reduced in the exhaust gas flow. Although the reaction mechanism is not yet known, it is assumed that the hydrocarbons react with $NO_2$ so that the latter is reduced.

It is preferred that the coating has two or more elements of the rare earth metals respectively in a concentration of 300.0 to 50000.0 g/m³. Interestingly, it was established that with these high concentrations of two or more rare earth metals in the coating, a particularly effective reduction of $NO_2$ takes place. A minimal sum concentration of the at least two rare earth metals is preferably 800.00 g/m³ or more.

It is particularly preferred that the coating has elements of the rare earth metals selected from the group comprising lanthanum, yttrium, cerium, neodymium and/or samarium. Coatings with these elements cause a particularly efficient reduction of $NO_2$.

Furthermore, it has proven useful if the coating has vanadium and/or palladium and/or rhodium. A vanadium concentration can be 100.0 to 10000.0 g/m³. A concentration of rhodium is preferably in a range of 200.0 to 2000.0 g/m³. If palladium is provided, the concentration thereof is advantageously 150.0 to 15000.0 g/m³.

Although on the one hand the precious metals palladium and/or rhodium can be provided, it is expedient on the other hand that the coating is essentially free from platinum, since a presence of platinum can be disadvantageous with respect to a reduction of $NO_2$.

Furthermore, it is advantageous if the coating contains barium and/or manganese, wherein these elements are present, for example, in the form of an oxide or a salt. Concentrations of barium as well as manganese are preferably respectively in the range of 150.0 to 1500.0 $g/m^3$, again based on the elements. The presence of barium and/or manganese in the coating causes a reduction of the minimum temperature for a reduction of $NO_2$, so that with the presence of one or preferably both of the elements, a reduction of $NO_2$ can already take place from a temperature of 100° C., which is much lower than with SCR systems, which work effectively only from a temperature of 200° C.

The coating can be composed of several coating layers. It is preferably provided that the coating has a lower coating layer on which an upper coating layer containing the rare earth metals is deposited. The lower coating layer is a so-called wash coat coating layer known from the prior art, which is composed essentially of aluminum oxide. In order to form the largest possible surface and thus to achieve a high catalytic efficiency, the upper coating layer can contain particles of crystalline silicon dioxide or a glass-like silicon dioxide phase, which particles on average are smaller than 100 nm.

The substrate can be formed in principle by any desired materials that are known from exhaust gas purification technology. For example, the substrate or the carrier can be embodied as a metal foam or ceramic foam, metallic woven wire or as a ceramic wall flow filter. It is preferred that the substrate or the carrier is formed from a ceramic material, in particular cordierite. In contrast to wall flow filters, the substrate can thereby be embodied with parallel channels, which extend from an inlet side to an outlet side of the substrate. This ensures that the slip catalyst does not contribute markedly to the increase of an exhaust backpressure. In order to nevertheless have a large catalytically active surface available, in a plane perpendicular to the parallel channels the substrate has fewer than 250, preferably approx. 100 to 200, cells per square inch (cpsi).

The further aim of the invention is achieved as mentioned by an exhaust train of the type mentioned at the outset, in which the slip catalyst is embodied according to the invention. One advantage achieved with an exhaust train according to the invention can be seen in that a content of $NO_2$ at the end of the exhaust train is lower than at the start, although the exhaust train comprises a CRT system.

In the radial direction, the slip catalyst preferably has lateral plates that are impermeable to gas and on which the slip catalyst is held in a housing of the exhaust train. This type of embodiment of the exhaust train comes to bear in particular when existing CRT systems are retrofitted with a slip catalyst according to the invention, in order at the end side to reduce a content of $NO_2$ in the exhaust train. It is then necessary only to open up a housing and to insert the slip catalyst and subsequently to connect the housing again with a clamp. It can be provided that a nozzle for the injection of hydrocarbons is arranged between the oxidizing catalyst or the particulate filter and the slip catalyst. In this case it is possible, if necessary, to promote a reduction of $NO_2$ by the injection of short-chained hydrocarbons, for example, with low hydrocarbon concentration in the engine-side exhaust gas flow.

BRIEF DESCRIPTION OF THE DRAWINGS

Further features, advantages and effects of the invention are shown by the following description of exemplary embodiments. The drawings, to which reference is made thereby, show.

DETAILED DESCRIPTION OF THE DISCLOSURE

Figure 1:
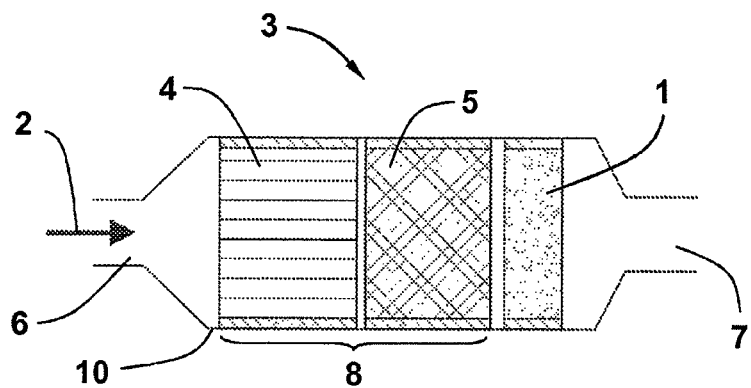
FIG. 1 an exhaust train in cross section.

FIG. 1 shows an exhaust train 3 of a diesel engine in cross section along a longitudinal axis. The exhaust train 3 is flowed through by an exhaust gas flow 2. The exhaust gas flow 2 enters the exhaust train 3 at an inlet side 6. Starting from the inlet side 6 up to an outlet side 7, an outer shape of the exhaust train 3 is determined by a housing 10. The housing 10 widens from the inlet side 6 towards a center region, before it tapers again towards the outlet side 7. An exhaust gas purification device 8 is arranged in the center region, widened in cross section. The exhaust gas purification device 8 comprises an oxidizing catalyst 4 and a particulate filter 5 connected downstream. The exhaust gas purification device 8 or oxidizing catalyst 4 and particulate filter 5 together form a CRT system, such as is known from the prior art. At the oxidizing catalyst 4, which for this purpose can be coated with suitable materials, NO present in the exhaust gas flow 2 is oxidized to $NO_2$. The $NO_2$ thus formed, like any already existing $NO_2$ on the particulate filter 5, reacts there with carbon black particles filtered out of the exhaust gas flow 2 with combustion of the same. Provided there are suitable operating temperatures, the exhaust gas purification device 8 operates without additional regenerating, that is, passively. However, this presupposes that an excess of $NO_2$ is present in all operating states with respect to a load factor with carbon black particles on the particulate filter 5. As a result, the $NO_2$ concentration in the exhaust gas flow 2 at the end of the particulate filter 5 is consistently higher than in the region of the inlet side 6. In this connection these are also referred to as $NO_2$ secondary emissions. In order to reduce the $NO_2$ secondary emissions as well as possible, a slip catalyst 1 is provided in addition downstream of the particulate filter 5. The slip catalyst 1 has a substrate or a carrier, which is gas permeable and basically can be composed of any desired materials that are known from the exhaust purification of vehicles. For example, the substrate can be composed of a metal foam, a ceramic foam, a metallic wire mesh or also a wound metal film. The use of a substrate in the form of a wall flow filter is also possible. However, it is preferred that the substrate or the carrier is composed of a ceramic material such as cordierite and has a plurality of parallel channels that extend parallel to the longitudinal axis of the exhaust train 3.

With regard to the embodiment of the size of the channels, it is provided that the substrate in cross section has fewer than 250 cpsi. A size of the channels is favorable that results in cross section perpendicular to the channels in a pore quantity of 100 to 200 cpsi. The substrate or the carrier has a first coating layer that is embodied as a wash coat coating layer and essentially is composed of aluminum oxide. A further upper coating layer is applied to the wash coat coating layer. In addition to aluminum oxide and/or silicon oxide, this upper coating layer has the elements given in Table 1 below.

TABLE 1

Elements of the upper coating layer

| Element | Form | Preferred content (g/m³) |
| --- | --- | --- |
| Rhodium | Elementary | 200.0 to 2000.0 |
| Palladium | Elementary | 150.0 to 15000.0 |
| Copper | Oxide | 100.0 to 10000.0 |
| Titanium | Oxide | 100.0 to 150000.0 |
| Lanthanum | Oxide | 300.0 to 20000.0 |
| Vanadium | Oxide | 100.0 to 10000.0 |
| Cerium | Oxide | 500.0 to 50000.0 |
| Barium | Oxide | 150.0 to 1500.0 |
| Manganese | Oxide | 150.0 to 1500.0 |

Furthermore, the elements yttrium with a content of 300.0 to 10000.0 g/m³, neodymium with a content of 150.0 to 5000.0 g/m³ and/or samarium with a content of 100.0 to 3000.0 g/m³ can be advantageously provided. However, this is not mandatory.

The lower coating layer preferably comprises silicon with a content of 50.0 to 20000.0 g/m³, aluminum with a content of 50.0 to 15000.0 g/m³ and iron with a content of 600.0 to 60000.0 g/m³.

Both coating layers are produced by immersion in a corresponding solution or suspension and subsequent calcination at a temperature of approx. 500° C. It has proven to be expedient thereby in order to enlarge a catalytically active surface, that crystalline or amorphous particles of silicon dioxide are present in the solution or suspension for the production of the upper coating layer, which particles have an average particle size of less than 100 nm.

Figure 2:
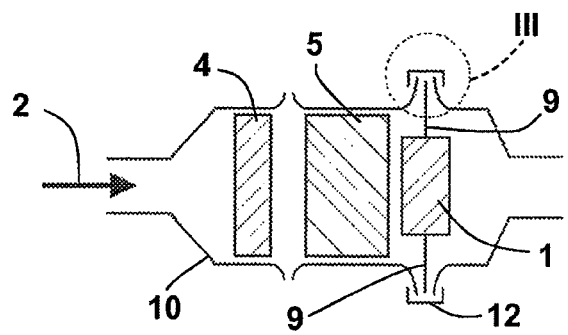
FIG. 2 a retrofitted exhaust train in cross section.
Figure 3:
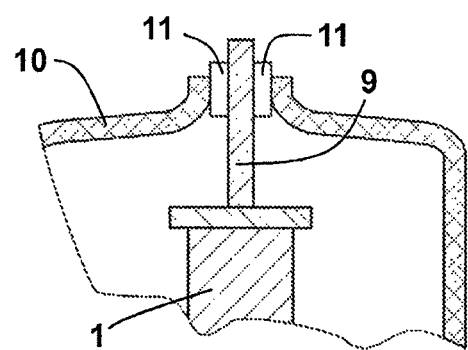
FIG. 3 a possible embodiment of an exhaust train in region III according to FIG. 2.

The exhaust train 3 can be prefabricated in a factory and installed in the exhaust train of a motor vehicle, for example. However, it is also possible, as shown diagrammatically in FIGS. 2 and 3, to additionally retrofit an exhaust train 3, already equipped or subsequently fitted with a CRT system, of a motor vehicle operated by diesel with a slip catalyst 1. In this case the housing 10 is cut open along the circumference, after which the slip catalyst 1 is inserted. In order to render possible a simple insertion, the slip catalyst 1 is equipped in the radial direction with lateral plates 9, which are impermeable to gas. The plates 9 are embodied in a thin manner and have a thickness of only 1 to 2 mm. Preferably, the plates 9 are formed of a steel. The slip catalyst 1 with the radial plates 9 can then easily be inserted into the housing 10 without special structural measures regarding the exhaust train 3 being necessary. For this purpose seals 11 are provided at the sides of the plates 9, which seals seal towards the housing 10, and the slip catalyst 1 with the radial plates 9 is inserted and subsequently fixed with a clamp 12 guided around the housing 10.

Figure 4:
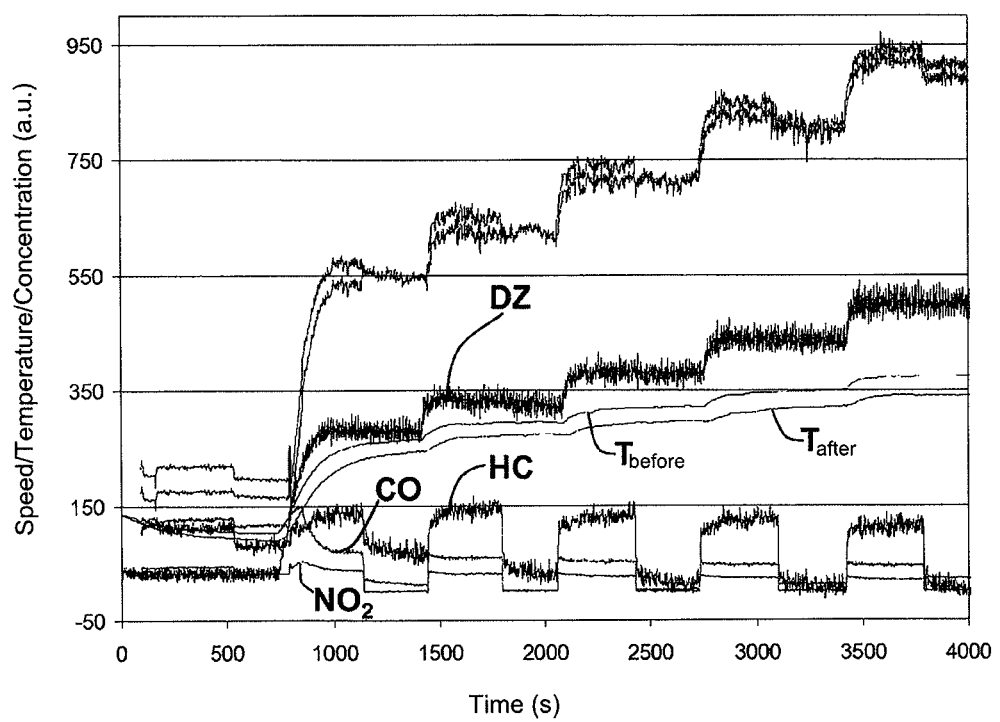
FIG. 4 a diagram regarding the reduction of a content of $NO_2$ in an exhaust train with varying load of an engine.

FIG. 4 shows a diagram regarding a $NO_2$ reduction in an exhaust train 3 with a slip catalyst 1 according to the invention. For various engine load stages with an increasing speed DZ of a diesel engine, in the exhaust train 3 respectively the temperature $T_{before}$ was measured before the slip catalyst 1 and the temperature $T_{after}$ was measured after the slip catalyst 1. Furthermore, the portions of hydrocarbons HC, carbon monoxide CO and nitrogen dioxide $NO_2$, respectively in ppm, were measured. Concentration measurements were thereby carried out for each engine load stage approximately half of the time before the slip catalyst 1 and approximately half of the time after the slip catalyst 1. As can be seen from FIG. 4, after the slip catalyst 1 $NO_2$, CO and the hydrocarbons HC are reduced to almost zero.

The invention claimed is:

1. A slip catalyst for reducing a $NO_2$ content in an exhaust train of an internal combustion engine flowed through by an exhaust gas flow, which has an oxidizing catalyst for the formation of $NO_2$ and a particulate filter arranged downstream for binding carbon black particles and simultaneous and/or subsequent reaction of the same with $NO_2$ formed on the oxidizing catalyst, comprising:
    a substrate that is provided with a coating, which coating reduces a proportion of $NO_2$ in the exhaust gas flow flowing through,
    wherein the coating has at least two elements from the group of rare-earth metals, which are present in the coating in the form of a salt or an oxide or in an elementary form and in a concentration of more than 300.0 g/m³ to 50000.0 g/m³,
    wherein the coating contains barium and/or manganese and palladium and/or rhodium, and is essentially free of platinum.

2. The slip catalyst according to claim 1, wherein the coating has elements of the rare earth metals selected from the group comprising lanthanum, yttrium, cerium, neodymium and/or samarium.

3. The slip catalyst according to claim 1, wherein the coating has vanadium.

4. The slip catalyst according to claim 1, wherein the coating has a lower coating layer on which an upper coating layer containing the rare earth metals is deposited.

5. The slip catalyst according to claim 4, wherein the lower coating layer is composed essentially of aluminum oxide.

6. The slip catalyst according to claim 4, wherein the upper coating layer contains particles of crystalline silicon dioxide or a glass-like silicon dioxide phase, which particles on average are smaller than 100 nm.

7. The slip catalyst according to claim 1, wherein the substrate is formed from a ceramic material, in particular cordierite.

8. The slip catalyst according to claim 1, wherein the substrate is embodied with parallel channels, which extend from an inlet side to an outlet side of the substrate.

9. The slip catalyst according to claim 8, wherein in a plane perpendicular to the parallel channels the substrate has fewer than 250, preferably approx. 100 to 200, cpsi.

10. An exhaust train of an internal combustion engine, comprising an exhaust gas purification device flowed through by an exhaust gas flow, which device has an oxidizing catalyst and optionally a particulate filter, wherein a slip catalyst for the reduction of a $NO_2$ content in the exhaust train flowed through by the exhaust gas flow is arranged downstream, wherein the slip catalyst is embodied according to claim 1.

11. The exhaust train according to claim 10, wherein in the radial direction, the slip catalyst has lateral plates that are impermeable to gas and on which the slip catalyst is held in a housing of the exhaust train.

12. The exhaust train according to claim 10, wherein a nozzle for the injection of hydrocarbons is arranged between the oxidizing catalyst or the particulate filter and the slip catalyst.

13. The slip catalyst according to claim 1, wherein the internal combustion engine is a diesel engine.

* * * * *